2,705,703

PROCESS FOR RAISING THE SOFTENING POINT OF HYDROCARBON RESINS

John F. McKay, Jr., Cranford, and Donald F. Koenecke, Elizabeth, N. J., assignors to Esso Research and Engineering Company, a corporation of Delaware No Drawing. Application November 1, 1951, Serial No. 254,448

14 Claims. (Cl. 260—45.5)

This invention relates to a method for improving the properties of hydrocarbon resins and more particularly relates to a method of improving the softening properties of olefin-diolefin resins without degrading the color.

It is known that hydrocarbon resins can be produced from certain refinery streams containing olefins and diolefins by a variety of methods such as polymerization using aluminum chloride or boron trifluoride as catalysts. The resins produced, however, have softening points that are too low for certain applications. For use as the binding ingredients in floor tile, for example, it is desirable that hydrocarbon resins have softening points of 105° C. or greater so that the floor tiles made therefrom have good hardness-indentation properties. Most of the resins that are produced from such hydrocarbon streams by Friedel Crafts polymerization have softening points lower than 100° C. Heretofore all attempts to raise the softening points of these resins have seriously degraded the color of the resins. This is undesirable, since light colored resins are premium materials. It has now been discovered that 5–10% or more of the synthetic oily polymers and copolymers of diolefins have a surprisingly beneficial effect on the softening point of hydrocarbon resins without seriously causing loss of color. By the process of this invention, the usually low softening hydrocarbon resins have their softening points raised so that they become suitable for use in floor tile and other places where high softening point is required.

Hydrocarbon resins to which the present invention is applicable are made from petroleum cracked distillates boiling in the range of about 30° C. to 280° C. or any fraction boiling within this range. The resins are prepared by treating the distillate with 0.25–2.5% of a Friedel Crafts type catalyst such as aluminum chloride, aluminum bromide, boron trifluoride, and the like or solutions, slurries, or complexes thereof. The reactions are conducted at temperatures in the range of 0–65° C., and preferably 10–54° C. Residual catalyst is quenched by suitable methods such as addition of methyl alcohol and subsequent filtration, water and/or caustic washing and the final solution is then stripped of unreacted hydrocarbons and low molecular weight oils by vacuum or steam distillation.

In place of the petroleum cracked distillates, the feed to polymerization may consist of mixtures of a diolefin with an olefin. Sufficient diolefin must be present and incorporated in the polymer to give a resin instead of an oil or a rubbery material.

The synthetic oils useful for improving the softening point of the above resins in accordance with the present invention are oily polymers or copolymers of butadiene, isoprene, dimethyl butadiene, piperylene, methyl pentadiene or other conjugated diolefins having four to six carbon atoms per molecule. Instead of polymerizing any of the aforesaid diolefins alone, they may be copolymerized in admixtures with each other or in admixtures with minor amounts of ethylenically unsaturated monomers copolymerizable therewith, e. g., with 5 to 30% of styrene, styrenes having alkyl groups substituted on the ring such as para methyl styrene, dimethyl styrene or diethyl styrene, acrylonitrile, methacrylonitrile, methyl acrylate, methyl methacrylate, vinyl isobutyl ether, methyl vinyl ketone, and isopropenyl methyl ketone. Such synthetic oils may be advantageously prepared by mass polymerization either in the presence of a hydrocarbon soluble peroxide catalyst such as benzoyl peroxide or cumene hydroperoxide, or in the presence of metallic sodium when the monomers consist of a diolefin or of a mixture of a diolefin with a styrene compound. Suitable polymerization procedures are illustrated below in Runs A and B. Throughout the present description it will be understood that all proportions are expressed on a weight basis unless otherwise specified.

Run A

For example, 100 parts of butadiene-1,3 or of piperylene, 50 parts of straight run mineral spirits boiling between 150 and 200° C. (Varsol), 3 parts of t-butyl hydroperoxide (60% pure) and 0.75 parts of diisopropyl xanthogen disulfide are heated in a closed reactor at about 90° C. for 40 hours, whereupon the residual pressure is released and unreacted butadiene is allowed to volatilize from the polymerized mixture at 70° C. The resulting product, which is a clear, water-white solution, consists typically of about 60 parts of oily polymer of butadiene or piperylene, about 4 parts of butadiene or piperylene dimer, plus solvent and some t-butyl alcohol. This solution of polymer is then preferably fractionated to remove the dimer and usually adjusted to 50% non-volatile matter content. The non-volatile constituent, which is the oily polymer of butadiene or piperylene, has a molecular weight between 1,000 and 10,000, preferably between 2,000 and 5,000. It will be understood, of course, that the foregoing procedure is only illustrative and that it can be modified in many ways, particularly as described in U. S. patent application Serial No. 782,850 of Arundale et al., filed on October 29, 1947, which describes alternative monomers, catalysts, reaction diluents, polymerization modifiers, suitable ranges of proportions of the various ingredients, suitable ranges of polymerization conditions, etc.

Run B

An alternative polymerization method using sodium as catalyst is illustrated as follows: 60 to 90 parts of butadiene-1,3 are copolymerized with 40 to 10 parts of styrene in an essentially inert diluent at temperatures ranging from about 25° to 95° C., or preferably between 40° and 85° C. About 1.5 to 5 parts of finely divided metallic sodium per 100 parts of monomers are used as catalyst and the reaction is preferably carried to complete conversion. Materials used as diluents in the polymerization are inert hydrocarbons which remain liquid under the reaction conditions employed. Accordingly, the diluents employed have a boiling point between −15 and 200° C., the low boiling diluents being useful where it is permissible to keep the reaction pressure sufficiently high to maintain the diluent in liquid condition at the reaction temperature used.

The preferred diluents used in the polymerization are predominantly paraffinic hydrocarbons such as naphtha having a boiling range between about 90° and 120° C., or straight-run mineral spirits such as "Varsol" having a boiling range between about 150° and 200° C. Pentane, benzene, cyclohexane and similar inert hydrocarbons are also useful individually or in admixture with each other. The hydrocarbon diluents are used in amounts ranging from 100 to 500, and preferably 200 to 300 parts per 100 parts of monomers. In other words, the resulting composition as synthesized normally contains about 20 to 50% of the polymer dissolved in a hydrocarbon solvent. When desired, as for use in the present invention, more concentrated compositions can be produced from the synthesis product by stripping off excess solvent.

It is also desirable to employ in the polymerization about 10 to 40 parts, preferably 20 to 30 parts, of an ether promoter per 100 parts of monomers. Cyclic di-ethers of 4 to 8 carbon atoms having an —O—C—C—O group, such as dioxane-1,4 and its methyl and ethyl homologues, have been found as particularly effective promoters. Other suitable ether promoters are aliphatic mono- or di-ethers of 4 to 8 carbon atoms such as diethyl ether, diethyl ether of ethylene glycol, and diethyl ether of diethylene glycol. Finally, it is also beneficial to use about 5 to 35 weight per cent (based on sodium) of an alcohol such as methanol, isopropanol or n-amyl alcohol, especially where the sodium catalyst particles are relatively coarse.

At the end of the reaction, the sodium catalyst is removed from the reaction product, for example, by addition of glacial acetic acid and removal of the resulting salt by filtration, and reaction diluent, ether and alcohol, if any, are separated to the desired extent by fractional distillation.

The resulting product, being usually a solution of polymeric oil in a suitable hydrocarbon solvent such as solvent naphtha or mineral spirits, is, depending on the amount and type of ether used, a clear, colorless to light yellow oil having a viscosity between about 0.5 and 25 poises, preferably 1 to 10 poises at a 50% solution in a hydrocarbon such as Varsol.

It will be understood that the described sodium polymerization method of Run B may be varied considerably as by omitting the styrene coreactant; or by adding the styrene only after the polymerization of butadiene monomer had begun; or dioxane may be replaced by 10 to 35 parts of another ether modifier having more than 2 carbon atoms such as methyl ethyl ether, or the modifier may be omitted altogether, especially when it is not essential to obtain a perfectly colorless product. Similarly, isopropanol is not necessary, though aliphatic alcohols of less than 6 carbon atoms generally have the beneficial effect of promoting the reaction when present in amounts ranging from about 2 to 50% based on the weight of sodium catalyst. Alternatively, the copolymerization of Run B may be carried out with a peroxide catalyst according to the method of Run A, and the polymerization of butadiene and piperylene may be carried out with a sodium catalyst according to the process of Run B.

According to the preferred method of carrying out the present invention, the hydrocarbon resin, prepared as described above, is placed in an agitated reactor together with 5-10% of the desired oily polymer or copolymer, preferably at 97-100% NVM. Oxygen and air are preferably excluded. The temperature is maintained at 240-280° C. until the desired increase in softening point is attained.

It is important that the temperature be maintained between 240° and 280° C. since at lower temperatures no copolymerization takes place and at higher temperatures the resin decomposes to dark colored products. It is also important to maintain the amount of oily polymer or copolymer not below 5% since the color is materially degraded when a less amount of oil is used. When more than 10% is used, gelation occurs, but this is important only if a clear product is desired. For such uses as floor tile, gelled products can be used without difficulty. For such uses, as much as 25% of the oily copolymer of butadiene and styrene can be added.

The following examples will serve to illustrate the mode of operation as well as the advantages of the present invention, though it will be understood that various other embodiments or modifications not specifically illustrated herein are possible without departing from the spirit or scope of the invention.

*Example 1*

A hydrocarbon stream consisting of 14% dienes, 42% olefins, and 42% aromatics and saturated hydrocarbons, prepared by steam cracking of a gas oil, was polymerized in the presence of aluminum chloride at a temperature of 25° C. A hydrocarbon resin was obtained in 25% yield having a softening point of 90° C. and a color of 3. The resin was recovered by stripping off the unreacted hydrocarbons. Analysis indicated that this resin was of a non-cyclic structure, little or none of the aromatic constituents of the feed having entered the composition.

*Example 2*

A butadiene-styrene copolymer oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight run mineral spirits; API gravity, 49.0; Flash, 105° F.; Boiling Range 150° to 200° C.; Solvent Power, 33–37 Kauri-Butanol Value (Reference Scale: Benzene-100 K. B. Value, n-heptane 25.4 K. B. Value).
[2] Dispersed to a particle size of 10 to 50 microns by means of an Eppenbach Homo-Mixer.

The polymerization of this charge was carried out at 50° C. in a 2-liter autoclave provided with a mechanical agitator. Complete conversion was obtained in 4.5 hours. The catalyst was destroyed and removed from the resulting crude product and the product was finished to contain 97% non-volatile matter. The resulting product had a viscosity of 2.4 poise at 50% non-volatile matter in Varsol.

*Example 3*

540 g. of a hydrocarbon resin made by the process of Example 1 and 60 g. of a synthetic oil made according to Example 2 and used at 97% NVM were placed in a flask and heated to 240–250° C. The reactor contents were stirred and blanketed with nitrogen. After 47 hours on temperature, the resin product was cooled. The modified resin had a softening point of 127° C. and a color of 3.

This co-bodied resin was used to make a floor tile with the following formulation:

| Parts | Material |
|---|---|
| 36 | Asbestos (Johns-Manville 7R) |
| 36 | Calcium Carbonate |
| 3 | Titanium Dioxide |
| 5 | Ferric Oxide |
| 15 | Modified Resin |
| 5 | Plasticizer (Zeco 3270, a pitch type plasticizer mfg. by G. S. Ziegler Co.) |
| 100 | |

The stock worked well on the hot mixing mill and was sheeted from a cold mill. The tile was lighter red in color than was a control tile made from a courmarone-indene resin with an equivalent formulation. The following evaluations show that the experimental floor tile passes federal specifications and is equivalent to the control floor tile.

| | McBurney Hardness, Mils | | Flex [1] | Impact | Curl |
|---|---|---|---|---|---|
| | Room Temp. ¼″ ball, 1 minute | 115° F. ¼″ ball, 30 seconds | | | |
| Experimental Floor Tile | 8 | 18 | 4½ | Pass | 0 |
| Control Floor Tile | 8 | 18 | 2 | Pass | 0 |

[1] Empirical test.—A ⅛″ x 2″ x 6″ tile is supported on ⅛″ rods spaced 5″ apart. A ⅛″ rod is placed on the center of the sample tile and depressed by means of a thumb screw. The number of turns of the screw before the tile breaks through flexure is counted, and is a measure of flexibility. A high value is desirable.

*Example 4*

The following data show the effect of varying the conditions of copolymerizing the resin of Example 1 with the synthetic oily polymer or copolymer of this invention:

sive decomposition and undesirable darkening of the resin (runs 11 and 12).

TABLE I

[Post-synthesis treatment of hydrocarbon resins [1].]

| Run Number | Treating Agent [2] | Additive | Temperature, °C. | Original Hydrocarbon Resin Soft Pt., °C.[3] | Color [4] | Time of Treatment | Modified Resin Soft Pt., °C.[3] | Color [4] |
|---|---|---|---|---|---|---|---|---|
| 1 | 10% Butadiene Styrene Oil.[5] | | 250-250 | 83 | 3 | 20 Hrs. / 26 Hrs. / 43 Hrs. / 66 Hrs. | 115 / 123 / 135 / 143 | 3 / 3 / 3 / 3 |
| 2 | 5% Butadiene Styrene Oil.[5] | | 250-250 | 83 | 3 | 5 Hrs. / 23 Hrs. / 47 Hrs. / 71 Hrs. | 91 / 104 / 123 / 124 | 3 / 3 / 4 / 4 |
| 3 | 2% Butadiene Styrene Oil.[5] | | 250-250 | 83 | 3 | 5 Hrs. / 23 Hrs. / 47 Hrs. / 71 Hrs. | 92 / 114 / 118 / 129 | 3 / 9 / 11 / 13 |
| 4 | 15% Butadiene Styrene Oil.[5] | | 240-250 | 81 | 3 | 6.5 Hrs. | 87 | 3 |
| 5 | 20% Butadiene Styrene Oil.[5] | | 240-250 | 81 | 3 | 24 Hrs. | Gelled | |
| 6 | None | | 240-250 | 81 | 3 | 6.5 Hrs. | 100 (Gelled) | 3 |
| 7 | 10% Butadiene Styrene Oil.[5] | | 280 | 85 | 4 | 5 Hrs. / 23 Hrs. / 47 Hrs. / 71 Hrs. | 87 / 98 / 109 / 113 | 3 / 4 / 8 / 9 |
| 8 | None | | 280 | 85 | 4 | 3 Hrs. | 107 | 3 |
| 9 | 10% Butadiene Styrene Oil.[5] | | 200 | 81 | 3 | 24 Hrs. / 24 Hrs. | 136 / 114 | 4 / 6 |
| 10 | do | | 160 | 90 | 3 | 18.5 Hrs. / 26 Hrs. / 71.5 Hrs. / 18.5 Hrs. | 77 / 80 / 85 / 81 | 3 / 3 / 3 / 3 |
| 11 | do | | 310 | 81 | 4 | 26 Hrs. / 71.5 Hrs. / 6.5 Hrs. | 81 / 82 / 117 | 3 / 3 / 7 |
| 12 | None | | 325 | 92 | 3 | 45 Min. | [6]72 | Very dark |
| 13 | 5% dehydrated Castor Oil | | 240-250 | 81 | 3 | 6.5 Hrs. | 81 | 4 |
| 14 | 5% Oiticica Oil | | 240-250 | 81 | 3 | 6.5 Hrs. / 24 Hrs. | 102 / 82 | 10 / 4 |
| 15 | 5% Polybutadiene Oil.[8] | | 240-250 | 83 | 3 | 6.5 Hrs. / 24 Hrs. | 89 / 106 | 8 / 5 |
| 16 | 5% Polypiperylene Oil.[8] | | 240-250 | 81 | 3 | 19 Hrs. / 41.5 Hrs. | 113 / 89 | 5 / 4 |
| 17 | 5% Butadiene Styrene Oil. | 0.5% Calcium Naphthenate.[7] | 240-250 | 83 | 3 | 6.5 Hrs. / 24 Hrs. / 29 Hrs. / 18 Hrs. | 99 / 103 / 105 / 126 | 4 / 4 / 3 / 10 |
| 18 | 10% Polybutadiene Oil.[8] | | 280 | 84 | 6 | 65 Hrs. / 2.5 Hrs. | 109 | 6 |

[1] Resins made from steam cracked distillate fractions by AlCl₃ polymerization.
[2] Percent based on hydrocarbon resin.
[3] All softening points by ring and ball method.
[4] 1 g. resin dissolved in 67 cc. xylene and color read on Gardner colorimeter scale. Rating of 3 is light amber. 6-8 is dark amber.
[5] Styrene 20%, butadiene 80% copolymer oil made according to Example 2 used at 97% non-volatile matter. Viscosity=2.4 p. when reduced to 50% NVM with Varsol.
[6] Cracking occurred. Very low boiling material collected in Dry Ice trap.
[7] Based on copolymer oil.
[8] Prepared according to Run B.

The data in Table I show the following:

1. The softening point of a hydrocarbon resin is increased with no degradation in color by polymerizing with 5 to 10% of butadiene-styrene oily copolymer at 240-280° C. (runs 1, 2, and 7).
2. The rate of increase in softening point tends to level out with time of reaction, i. e., the greatest increase in softening point occurs during the early hours of reaction (runs 1 and 2).
3. The reaction occurs two or six times faster at 280° C. than it does at 240° C.-250° C. (runs 1 and 7).
4. The increase in softening point of the resin is far greater than that attained by heat treatment of hydrocarbon resin by itself. In addition, the latter degrades resin color (runs 7 and 8).
5. Reacting hydrocarbon resin with less than 5% of butadiene-styrene oily copolymer oil increases softening point but degrades color, therefore is undesirable (run 3).
6. Reacting hydrocarbon resin with 15% or more butadiene-styrene oily copolymer results in gelation. While such gelled resins are not suitable for certain applications where clear coatings are desired, they may be used to make satisfactory floor tile (run 4).
7. Reacting hydrocarbon resin with butadiene-styrene copolymer oil at 200° C. or lower is inoperable. In such cases, the synthetic copolymer oil merely acts to plasticize the resins (runs 9 and 10).
8. Reacting hydrocarbon resin with butadiene-styrene oil at 310° C. or higher is inoperable because of excessive decomposition and undesirable darkening of the resin (runs 11 and 12).
9. Hydrocarbon resins cannot be co-bodied with vegetable drying oils such as dehydrated castor oil or oiticica oil for the purposes of this invention without seriously degrading resin color (runs 13 and 14).
10. The use of 5% polybutadiene oil or polypiperylene oil as resin co-bodying agents is almost as effective as the use of the butadiene-styrene copolymer and the color is only slightly degraded (runs 15 and 16).
11. Addition of naphthenate driers to the reaction degrades resin color (run 17).
12. The use of 10% polybutadiene oil appears to be even more effective in raising the softening point of the resin than an equivalent amount of the butadiene-styrene copolymer (runs 18 and 7).

The nature of the present invention having been thus fully set forth and specific examples of the same given, what is claimed as new and useful and desired to be secured by Letters Patent is:

1. A process for raising the softening point of a petroleum cracked distillate resins which comprises mixing 100 parts of the resin with at least 5 parts of an oily diolefin hydrocarbon polymer and heating the mixture at a temperature of between 240° and 280° C.

2. A process for raising the softening point of a petroleum cracked distillate resins which comprises mixing 100 parts of the resin with at least 5 parts of an oily diolefin polymer chosen from the class consisting of polybutadiene, polypiperylene and the copolymer of styrene and butadiene, and heating the mixture at a temperature of between 240° and 280° C.

3. A process for raising the softening point of a petroleum cracked distillate resins which comprises mixing 100 parts of the resin with 5 to 10 parts of an oily copolymer of butadiene and styrene prepared by mass polymerization and heating the mixture at a temperature between 240° and 280° C. in the substantial absence of oxygen.

4. A process for raising the softening point of a petroleum cracked distillate resins which comprises mixing 100 parts of the resin with 5 to 10 parts of an oily polymer of butadiene prepared by mass polymerization and heating the mixture at a temperature between 240° and 280° C. in the substantial absence of oxygen.

5. A process for raising the softening point of a petroleum cracked distillate resins which comprises mixing 100 parts of the resin with 5 to 10 parts of an oily polymer of piperylene prepared by mass polymerization and heating the mixture at a temperature between 240° and 280° C. in the substantial absence of oxygen.

6. A process for raising the softening point of a petroleum cracked distillate resins which comprises mixing 100 parts of the resin with 5 to 10 parts of an oily copolymer of butadiene and styrene having a viscosity of about 0.5 to 25 poises and heating the mixture at a temperature between 240° and 280° C. in the substantial absence of oxygen.

7. A process according to claim 3 wherein the oily copolymer is composed of 80% of combined butadiene and 20% of combined styrene.

8. A process for preparing a hydrocarbon resin of high softening point, which comprises heating to 240°–280° C. a petroleum cracked distillate resins and at least 5% of a synthetic oil prepared by copolymerization of butadiene and styrene at temperatures between 25° and 95° C. in the presence of 1.5 to 5% of sodium.

9. A process for raising the softening point of a hydrocarbon resin obtained by heating a petroleum cracked distillate boiling in the range of about 30° to 280° C. in the presence of 0.25 to 2.5% Friedel Crafts type catalyst to a temperature of 0–65° C., which comprises heating to 240°–280° C. the said resin and at least 5% of an oily polymer prepared by heating a conjugated diolefin to temperatures between 25° and 95° C. in the presence of 1.5% to 5% of sodium.

10. Process according to claim 9 in which the diolefin is butadiene.

11. Process according to claim 10 in which 20% of the butadiene is replaced by styrene.

12. Process according to claim 9 in which the diolefin is piperylene.

13. A process for preparing a hydrocarbon resin of high softening point, which comprises heating to 240°–280° C. a petroleum cracked distillate resins and at least 5% of a synthetic oil prepared by polymerization of butadiene at temperatures of 90° C. in the presence of 3 parts of tertiary butyl hydroperoxide and 0.75 parts of diisopropyl xanthogen disulfide.

14. A process for preparing a hydrocarbon resin of high softening point, which comprises heating to 240°–280° C. a petroleum cracked distillate resins and at least 5% of a synthetic oil prepared by polymerization of piperylene at temperatures of 90° C. in the presence of 3 parts of tertiary butyl hydroperoxide and 0.75 parts of diisopropyl xanthogen disulfide.

References Cited in the file of this patent

UNITED STATES PATENTS

| | | |
|---|---|---|
| 2,252,333 | Rothrock | Aug. 14, 1941 |
| 2,380,456 | Maier et al. | July 31, 1945 |